March 1, 1966  F. W. SCHMIDLIN  3,238,513
PERSISTENT CURRENT SUPERCONDUCTIVE CIRCUITS
Filed July 9, 1959  2 Sheets-Sheet 1
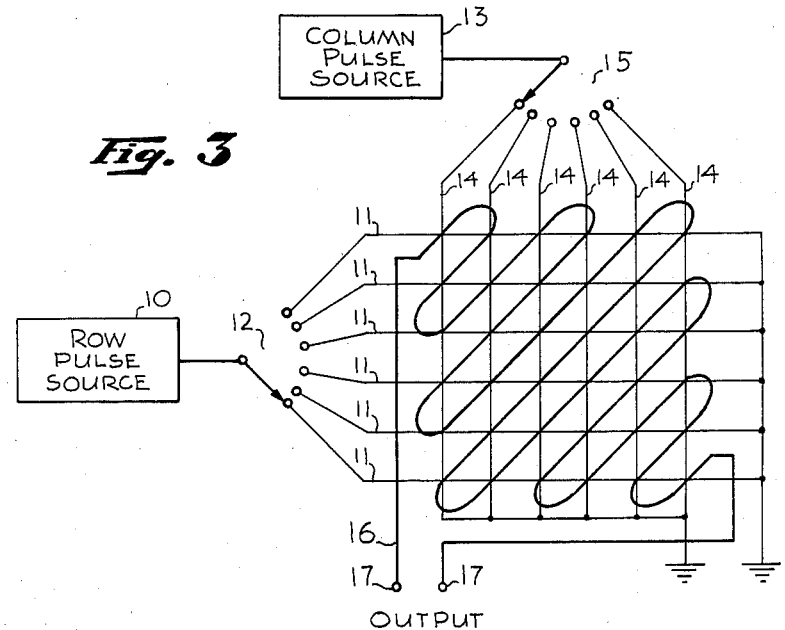
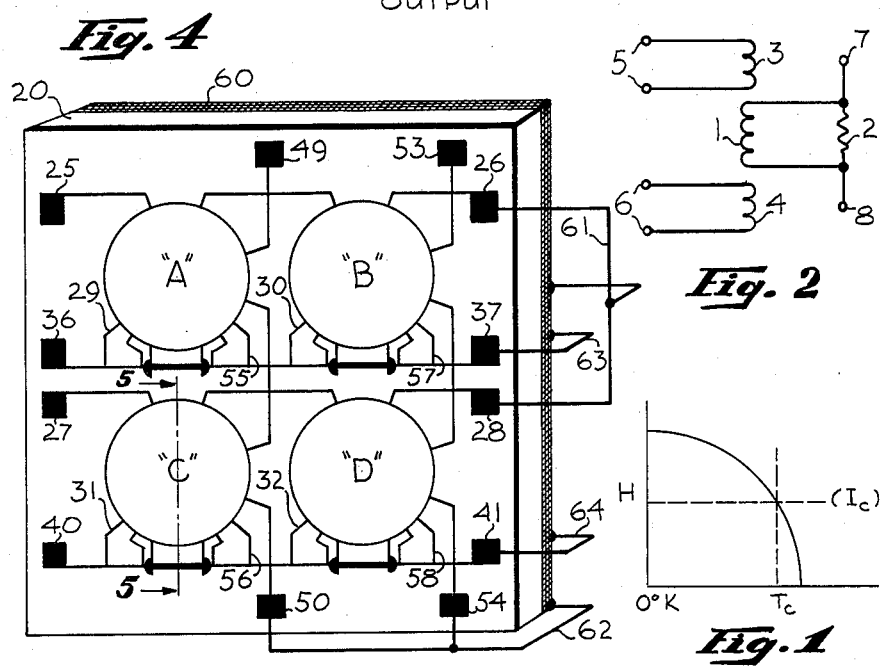
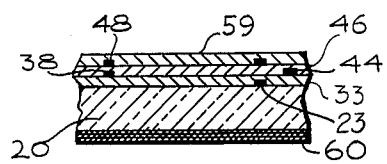
FREDERICK W. SCHMIDLIN
INVENTOR.
BY
ATTORNEYS March 1, 1966     F. W. SCHMIDLIN     3,238,513
PERSISTENT CURRENT SUPERCONDUCTIVE CIRCUITS
Filed July 9, 1959     2 Sheets-Sheet 2

FREDERICK W. SCHMIDLIN
INVENTOR.

BY
ATTORNEYS

United States Patent Office 3,238,513
Patented Mar. 1, 1966

3,238,513
PERSISTENT CURRENT SUPERCONDUCTIVE
CIRCUITS
Frederick W. Schmidlin, Inglewood, Calif., assignor, by mesne assignments, to The Bunker-Ramo Corporation, Canoga Park, Calif., a corporation of Maryland
Filed July 9, 1959, Ser. No. 826,094
17 Claims. (Cl. 340—173.1)

This invention relates to superconductive electrical circuits and more particularly to a new and improved superconductive electrical circuit for sustaining a persistent circulating current.

In a copending United States patent application entitled, "Superconductive Electrical Circuits," filed June 5, 1957, Serial No. 663,668, in the name of Eugene C. Crittenden, Jr., there is described an electrical circuit constructed of superconductive materials which is capable of sustaining a persistent circulating current flow around a loop indefinitely so long as the entire loop remains superconducting. By virtue of the capability of the circuit loop in sustaining a current, a device may be constructed for storing information as a function of the direction of persistent current flow, with the direction of current flow being ascertainable by applying a sensing pulse to the loop which renders a portion of the loop electrically resistive when the sensing pulse is additive with respect to the persistent flow through that portion. Thus, to read the stored information, a sensing pulse may be applied to the loop and the appearance of a voltage across the electrically resistive portion indicates a persistent circulating current in one direction while the absence of a voltage pulse indicates that the direction of persistent current flow is in the opposite direction. A number of the above described electrical circuits may be connected in a matrix arrangement in which information is stored and retrieved from the system through the application of current pulses to selected row and column crossbar connections.

Electrical circuits of the aforesaid Crittenden application may be satisfactorily employed not only as information storage elements but also as components of circuits for performing logical functions. For example, there is disclosed in United States Patent No. 2,877,448, entitled, "Superconductive Logical Circuits," issued March 10, 1959, in the name of James J. Nyberg, a number of circuit configurations in which superconductive circuit loops may be employed to perform functions of either a logical "AND" circuit or a logical "OR" circuit.

With a combination of logical circuits and information storage circuits, a complete data processing system may be constructed in which information and instructions may be stored, manipulated, or subjected to computations.

Accordingly, it is one object of the present invention to provide a new and improved superconductive electrical circuit which may be simply and inexpensively fabricated.

It is another object of the present invention to provide a new and improved matrix memory system utilizing superconductive components which may be simply and inexpensively fabricated.

It is yet another object of the present invention to provide a new and improved superconductive electrical circuit in which spurious signals are substantially cancelled.

It is still another object of the present invention to provide a new and improved matrix memory system utilizing superconductive components in which spurious signals produced by the application of pulses to the crossbar connections of the matrix are substantially cancelled in an output circuit.

Briefly, in accordance with one aspect of the invention, a superconductive electrical circuit for sustaining circulating currents is constructed by sandwiching a superconductive circuit loop between setting coils which are adapted to induce current flow within the superconductive loop in response to pulses applied to the setting coils. The sandwich construction may be supported upon a base plate with insulating layers being interleaved between the setting coils and the superconductive circuit loop.

In accordance with another aspect of the invention, spurious signals appearing in an output circuit connected serially with a portion of the superconductive circuit loop produced by the application of pulses to the setting coils are substantially eliminated by a special configuration of the setting coils which inductively couples the setting coils to the output circuit.

In accordance with yet another aspect of the present invention, a plurality of superconductive circuit loops are arranged in rows and columns to form a matrix memory system with a pair of setting coils being associated with each superconductive circuit loop for establishing persistent circulating currents therein and for ascertaining the direction of a persistent circulating current previously established therein.

A novel construction in which the superconductive circuit loops are sandwiched between the setting coils and supported on a base plate with interleaved insulation layers between the setting coils and the superconductive circuit loops leads to an inexpensive arrangement which is simple to fabricate. Signals may be derived from an output circuit which is connected serially with a portion of each of the plurality of circuit loops. By adopting the aforementioned special configuration for each of the setting coils, spurious signals appearing in the output circuit in response to the operation of the setting coils are substantially eliminated.

In accordance with still another aspect of the invention, a sheet of superconductive material is positioned adjacent a superconductive device. The sheet functions to shield the device in accordance with the Meissner effect as well as to cooperate with the connections to the device to form a transmission line having a desired characteristic impedance while pulses may be applied to and derived from the device with a minimum of distortion.

A better understanding of the invention may be had from a reading of the following detailed description and an inspection of the drawings, in which:

FIG. 1 is a graphical illustration of the variation in transition temperature of a particular superconductive material as a function of an applied magnetic field;

FIG. 2 is a schematic circuit diagram of a superconductive circuit loop associated with a pair of setting coils included here for the purposes of explanation and described and claimed in the aforementioned Crittenden application Serial No. 663,668;

FIG. 3 is a combined block and schematic circuit diagram of a matrix memory system;

FIG. 4 is a perspective view of a new and improved matrix memory system utilizing superconductive circuit loops in accordance with the present invention;

FIG. 5 is a partial sectional view taken along line 5—5 of FIG. 4;

Figure 6:
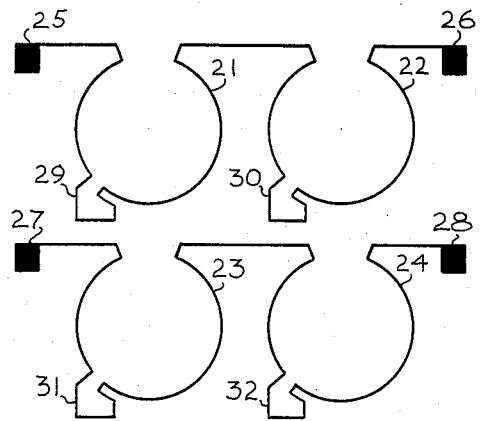
FIG. 6 is a plan view of a first group of setting coils forming a part of the matrix of FIG. 4.

At temperatures near absolute zero, some materials lose all resistance to flow of electrical current and become perfect conductors. This phenomenon is called superconductivity and the temperature at which the change occurs from a normally resistive state to a superconductive state is called the transition temperature. It has been established that where a superconductive material is held at a temperature below its transition temperature, the superconductive state may be extinguished by the application of an external magnetic field to the material or by current flow through the material in an amount in excess of a critical value. For example, in FIG. 1 of the drawings, the relationship between the transition temperature of a particular material as a function of an applied magnetic field is shown. In the absence of a magnetic field, the point at which the curve intersects the abscissa is the transition temperature at which the material becomes superconductive. For values of temperature and magnetic field falling beneath the curve, the particular material is superconductive, while for values of temperature and magnetic field falling above the curve, the material possesses electrical resistance.

In FIG. 1, the dashed line $T_c$ represents a constant temperature line. For magnetic fields greater than the value of the point of intersection between the line $T_c$ and the curve, the particular material is electrically resistive when held at the temperature $T_c$. However, for a magnetic field having a value less than the point of intersection between the line $T_c$ and the curve, the material is superconductive.

Since a current flowing in the material has an effect upon the transition temperature similar to a magnetic field, FIG. 1 also represents the effect of varying the current flowing through the material. At the temperature $T_c$, for currents in excess of a critical current value ($I_c$), the material is normally resistive, and for currents less than the critical current value, the material is superconductive.

FIG. 2 illustrates one type of superconductive electrical circuit described in the aforesaid Crittenden application which is adapted to operate in according with the foregoing principles. The circuit of FIG. 2 includes a first superconductor which is represented as an inductance 1 and a second superconductor which is represented as a resistance element 2 connected with the superconductor 1 to form a circuit loop. Both the superconductor 1 and the superconductor 2 are constructed of materials which are superconductive at the operating temperature of the circuit. However, the superconductor 2 is constructed to have a critical current value at which the superconductor switches from a superconductive state to a resistive state lower than the critical current value at which the superconductor 1 switches from a superconductive state to a resistive state. Preferably, the critical current value of the superconductor 2 may be lower than that of the superconductor 1 by a factor of two.

In operation, the electrical circuit of FIG. 2 is held at an operating temperature below the transition temperatures in the absence of a magnetic field of both the superconductor 1 and the superconductor 2. Since the superconductor 2 is arranged to have a critical current value lower than the critical current value of the superconductor 1, the entire circuit loop is superconductive for current flow less than the critical current value of the superconductor 2. Accordingly, no electrical resistance is presented to current flow less than the critical current value of the superconductor 2 and once such a current is established, the current flows around the loop indefinitely. Thus, a persistent circulating current may be established in the circuit loop which will continue to flow so long as the superconductor 1 and the superconductor 2 remain superconducting. However, since the superconductor 2 has a critical current value lower than that of the superconductor 1, the superconductor 2 is subject to being made electrically resistive by current flowing around the loop without affecting the superconductive state of the superconductor 1 where the value of the current is in excess of the critical current value of the superconductor 2 and is lower than the critical current value of the superconductor 1.

In the arrangement of FIG. 2, electrical pulses for initiating a persistent circulating current may be applied to the circuit loop via the setting coils 3 and 4. The superconductor 1 and the setting coils 3 and 4 are mutually coupled so that a pulse applied to the terminals 5 associated with the setting coil 3 or the terminals 6 associated with the setting coil 4 is induced in the superconductor 1. If the current induced in the circuit loop as a result of the energization of both the setting coils 5 and 6 is in excess of the critical current value of the superconductor 2, the superconductor 2 becomes electrically resistive and the current within the circuit loop decays to a level approximately equal to or slightly less than the critical current value of the superconductor 2. At this point, the superconductor 2 switches from an electrically resistive state to a superconductive state. As the energizing currents are removed, a reverse current is set up in the loop which continues to flow around the circuit loop as a persistent circulating current so long as the superconductor 2 and the superconductor 1 remain superconducting. Therefore, information may be stored in the circuit loop of FIG. 2 as a function of the direction of persistent circulating current flow by applying pulses to the terminals 5 and 6 of a selected polarity. Furthermore, the mutual coupling between the superconductor 1 and the setting coils 3 and 4, as well as the amplitude of the pulses applied to the terminals 6 and 7, may be selected so that the application of a pulse to one of the setting coils 3 and 4 alone is insufficient to induce a current which renders the superconductor 2 electrically resistive so that the appearance of a pulse on a single one of the setting coils 3 and 4 is ineffective with respect to either establish a persistent circulating current within the circuit loop or to alter the direction of a persistent circulating current previously established.

In order to sense the direction of current flow within the circuit loop, a pulse may be applied to the setting coils 3 and 4. When the induced current pulse is additive with respect to a persistent circulating current flow through the superconductor 2, the total amount of current becomes sufficiently large to render the superconductor 2 electrically resistive so that a voltage appears at the terminals 7 and 8. As a result of the voltage across the superconductor 2, the direction of persistent circulating current flow within the circuit loop is reversed. Thus, after the voltage appears, a persistent circulating current flows around the circuit loop in a direction opposite to the direction of persistent circulating current flow prior to the application of the pulse to the setting coils 3 and 4.

On the other hand, an induced current flow which is subtractive with respect to the persistent circulating current flowing through the superconductor 2 does not render the superconductor 2 electrically resistive so long as the net current flow does not exceed the critical current value of the superconductor 2. Accordingly, no voltage appears across the superconductor 2 in the latter case, and the persistent circulating current in the circuit loop continues to flow in the same direction as before. Thus, by inducing a pulse in the circuit loop, the direction of persistent circulating current flow may be ascertained by the presence or absence of a voltage across the superconductor 2. However, even though the superconductor 2 is not rendered electrically resistive in response to a subtractive applied current pulse, the fluctuation in current flow through the superconductor 2 has been found to produce a small but bothersome voltage between the terminals 7 and 8 by virtue of the self-inductance of the portion of the loop including the superconductor 2. That is, a voltage is produced across the distributed inductance of the superconductor 2 which opposes the change of current flow therethrough even though the amount of distributed inductance present is relatively small.

In accordance with one aspect of the invention described in detail below, spurious signals appearing in the output circuit connected to the superconductor 2 are substantially eliminated by inductively coupling the setting coils 3 and 4 to an output circuit in a manner which substantially cancels any such spurious signals.

FIG. 3 illustrates diagrammatically a matrix arrangement in which a plurality of persistent circulating current memory devices similar to FIG. 2 may be arranged in rows and columns to function as a memory system in a digital computer or data processing system. In FIG. 3, energizing current pulses from a row pulse source 10 are applied to a selected one of a plurality of horizontal crossbar connections 11 via a suitable electrical connection device such as a switch 12. In a similar fashion, current energizing pulses from a column pulse source 13 are applied to a selected one of a plurality of vertical crossbar connections 14 via a switch 15. At each of the junction points between the horizontal crossbar connections 11 and the vertical crossbar connections 14 may be located a persistent circulating current memory device such as that illustrated in FIG. 2, with one of the setting coils being connected at each location in series with a vertical crossbar connection and the other of the setting coils being connected serially with a horizontal crossbar connection. Each of the superconductive loops of the memory device may be connected serially in an output circuit 16 terminating at a pair of output terminals 17.

In operation, the amplitudes of the pulses from the row pulse source 10 and the column pulse source 13 may be selected so that only the memory device located at the junction at which current pulses are simultaneously applied receives an induced current pulse which is sufficiently large to establish a persistent circulating current within the selected device. Accordingly, by positioning the switches 12 and 15, any desired memory device may be energized from the row and column pulse sources 10 and 13 for establishing a persistent circulating current for the storage of information.

In a similar fashion, information previously stored in the matrix of FIG. 3 may be derived by applying pulses from the row and column pulse sources 10 and 13 to a selected one of the memory devices. As noted above, where the induced current pulse is additive with respect to the current flow through the superconductor having a lower critical current value, the superconductor is rendered electrically resistive with the result that a voltage pulse appears across the terminals 7 and 8. Therefore, whenever the pulses from the row and column pulse sources 10 and 13 render a superconductor in a selected one of the superconductive loops electrically resistive, a voltage pulse appears between the terminals 17 by virtue of the fact that all of the superconductive loops are connected serially via the output circuit 16.

While the above described matrix arrangement of FIG. 3 is shown and claimed in the copending Crittenden patent application Serial Number 663,668, in accordance with one aspect of the present invention, there is provided a new and improved construction of a matrix memory system functioning in accordance with the principles initially set forth in the Crittenden application and discussed briefly above. Furthermore, in the arrangement of FIG. 3, it has been found that the application of current pulse from the row and column pulse sources 10 and 13 may produce spurious signals in the output circuit 16. In accordance with another aspect of the invention, a special configuration is provided for substantially eliminating such spurious signals.

An arrangement of a plurality of superconductive memory devices in accordance with the invention is shown in the perspective view of FIG. 4, which for simplicity of illustration includes only four separate devices, although it will be appreciated that the principles of the invention described below may be applied to a matrix memory system or to an individual device as well. The construction of the device of FIG. 4 may best be understood by reference to the sectional view of FIG. 5 taken in conjunction with the plan views of FIGS. 6–9.

The arrangement of FIGS. 4–9 includes a base plate 20 of a suitable insulating material such as glass or mica. Deposited on the base plate 20 by vacuum deposition techniques or the like are four separate setting coils 21, 22, 23 and 24, best illustrated in the plan view of FIG. 6, which corresponds to the configuration of the deposited material forming the setting coils. Thus, in FIG. 6 a pair of circular setting coils 21 and 22 are connected serially between two row connections 25 and 26. Similarly, a pair of circular setting coils 23 and 24 are connected serially between a pair of row connections or terminals 27 and 28. Each of the setting coils 21–24 includes a special configuration which is included for the purposes of inductively coupling the setting coils 21–24 to the output circuits of the matrix in a manner which substantially cancels spurious signals. Accordingly, the circular setting coils 21–24 are each connected to an L-shaped conductor 29, 30, 31 and 32, respectively, which functions in cooperation with connections to the superconductive loops to be described in detail below.

As illustrated in FIG. 5, the setting coil arrangement of FIG. 6 is deposited on one surface of the base plate 20. A suitable insulating layer 33 is then deposited on top the base plate 20 covering the coils of FIG. 6. On top of the insulating layer 33 and in alignment with the setting coils of FIG. 6 is deposited a first set of superconductors in the configuration of FIG. 7 which correspond to the superconductor 1 represented as an inductive circuit element in FIG. 2. Thus, in FIG. 7, a pair of circular superconductors 34 and 35 are connected serially between a pair of output connections 36 and 37 and a pair of circular superconductors 38 and 39 are connected serially between a pair of output connections 40 and 41.

Figure 7:
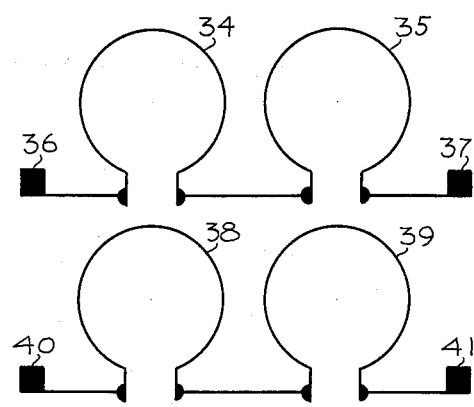
FIG. 7 is a plan view of a group of superconductive elements forming a portion of the superconductive circuit loops of the matrix memory system of FIG. 4.
Figure 8:
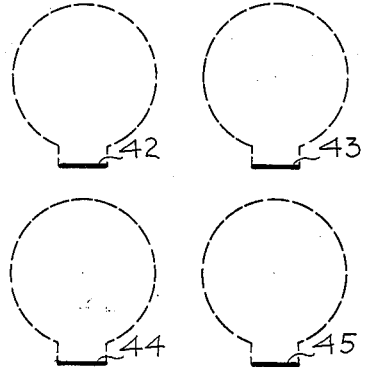
FIG. 8 is a plan view of a group of superconductive elements also forming a portion of the superconductive circuit loops of the matrix memory system of FIG. 4.

On top of the superconductor arrangement of FIG. 7 are deposited four superconductor elements 42–45 in the configuration of FIG. 8 which are placed in alignment with the connections between the terminals 36–37 and 40–41 respectively so as to complete four circuit loops with the circular superconductors 34, 35, 38 and 39. The four superconductors 42–45 each correspond to the superconductor 2 represented as a resistance element in FIG. 2. The superconductor 42 completes a first circuit loop "A" with the circular superconductor 34, the superconductor 43 completes a second circuit loop "B" with the superconductor 35, the superconductor 44 completes a third circuit loop "C" with the superconductor 38, and the superconductor 45 completes a fourth circuit loop "D" with the superconductor 39. Each of the superconductors of FIG. 8 may be constructed of a material or formed in a configuration so that the loops of FIG. 7 are completed by connections having a critical current value lower than that of the circular superconductors. Accordingly, as described above in connection with FIG. 2, each of the superconductors 42–45 is capable of being rendered electrically resistive, while the circular superconductors 34, 35, 38 and 39 remain superconductive whenever the value of the current flow about the circuit loop exceeds the critical current value of the superconductors of FIG. 8 and is less than the critical current value of the circular superconductors of FIG. 7.

As shown in FIG. 4, the patterns of FIGS. 6, 7 and 8 are aligned so that the setting coils are coupled to the superconductive loops and the connections between the output terminals 36, 37 and the output terminals 40, 41 are aligned with the L-shaped conductors 29–32 of FIG. 6 so that there is accomplished an inductive coupling between the setting coils and the output connections which functions to eliminate spurious signals from the output circuit as described in detail below.

Figure 9:
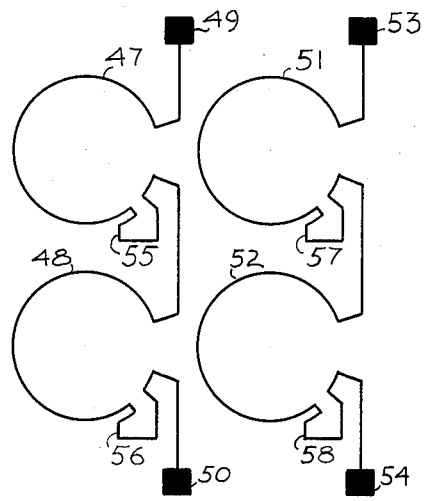
FIG. 9 is a plan view of a second group of setting coils forming a part of the matrix memory system of FIG. 4.

On top of the superconductors of FIGS. 7 and 8 is deposited a second insulating layer 46 as shown in FIG. 5, and on top of the second insulating layer 46 there is deposited a second group of setting coils having the configuration illustrated in FIG. 9. In FIG. 9, a pair of setting coils 47 and 48 are connected serially between the column connections 49 and 50 while a pair of setting coils 51 and 52 are connected serially between a pair of column connections 53 and 54. As in the case of the setting coils of FIG. 6, each of the setting coils illustrated in FIG. 9 includes an L-shaped conductor 55, 56, 57 and 58 which is aligned with one of the connections between the output terminals 36–37 and 40–41. Accordingly, each of the setting coils 47, 48, 51, 52 is inductively coupled to the output circuit for the purpose of substantially eliminating spurious signals occurring therein.

Again, referring to FIG. 5, an insulating layer 59 may be deposited on top of the setting coil arrangement of FIG. 9 to seal the conductors of the setting coil as well as to allow a number of matrices to be stacked together. The terminals 25–28, 36, 37, 40, 41, 49, 50, 53 and 54 may be exposed for electrical connection by removing the insulating layers or by masking the terminals when the insulating layers are deposited. In the alternative, a grommet may be passed through the sandwich as a whole in the location of each terminal to achieve an electrical connection.

Although in the arrangement of FIG. 4 an output circuit between the terminals 36 and 37 serves the devices "A" and "B," and a second output circuit between the terminals 40 and 41 serves the devices "C" and "D," it will be appreciated that any desired configuration of connections may be readily made, such as for example, the diagonal connections illustrated in the matrix arrangement of FIG. 3.

Affixed to the back side of the base plate 20 of the arrangement of FIGS. 4 and 5 is a sheet of superconductive material 60 which in accordance with the Meissner effect inhibits the passage of magnetic fields when the material is superconductive. Accordingly, by means of the sheet 60, a number of the matrix arrangements of FIG. 4 may be stacked tightly together with no interaction occurring between adjacent memory elements. However, due to the sandwiched construction in which the superconductive loops are interleaved between the setting coils in each individual memory element, highly efficient operation is achieved in which persistent circulating currents may be established in the circuit loops by applying set pulses to selected ones of the row connections 25–28, and column connections 49, 50, 53 and 54.

Furthermore, in accordance with the invention, sheet 60 may be adapted to cooperate with the memory elements to apply and derive pulses with a minimum of distortion. For example, by connecting the row connection terminals 26 and 28, and the column connection terminals 50 and 54 to the sheet 60, as shown in FIG. 4 diagrammatically by the leads 61 and 62, a return current path may be provided for row and column set pulses applied to the terminals 25 and 27 and column terminals 49 and 53. It will be appreciated that in a practical embodiment, the connection represented by the leads 61 and 62 may comprise deposited conductors, wires, or feed through grommets as desired. The superconductive sheet 60 forms an image of the current flow through the connections to the setting coils 21–22, 23–24, 47–48 and 51–52 so that a transmission line is formed having a characteristic impedance determined by the spacing between the sheet 60 and the connections, as well as by the thickness and material of the base plate 20 which functions as a dielectric. Therefore, by employing sheet 60 as a return current circuit (which may be grounded if desired) a transmission line is formed having a desired characteristic impedance which is capable of transmitting setting pulses at high repetition rates with minimum distortion. Preferably, the configuration is arranged to have a minimum inductance value since the existence of inductance in the connections produces distortion by rounding the wave shape of the pulses.

In a similar fashion, the sheet 60 may be employed as a return current path for the output circuits connected to the superconductive loops by connecting selected ones of the terminals 36, 37, 40 and 41 to the sheet 60, as for example, by means of the leads 63 and 64 represented diagrammatically in FIG. 4.

In the actual construction of a matrix memory system in accordance with the invention, each of the setting coils may comprise vacuum deposited lead conductors having a thickness of the order of 5000 Angstrom units and a diameter of ¾ inch, with the width of each conductor being of the order of .010 inch. The insulation between the setting coils and the superconductors may comprise zinc sulphide which is vacuum deposited to a thickness of the order of 30,000 Angstrom units, although it will be appreciated that the minimum thickness of insulation commensurate with maintaining an electrical separation between the components is to be desired.

The superconductors of FIG. 7, forming the circular portion of each of the several circuit loops, may also be constructed of lead in the thickness of the order of 5000 Angstrom units, a diameter of ¾ inch, and a width of .010 inch. The superconductors of FIG. 8 may be constructed of the same material as the circular superconductors of FIG. 7, where the cross-sectional configuration of the superconductors of FIG. 8 inherently provides a critical current value lower than that of the circular superconductors of FIG. 7. However, in one particular arrangement of the invention, the superconductors of FIG. 8 were constructed of a material having a lower transition temperature than the superconductors of FIG. 7. For example, tin may be employed for the conductors of FIG. 8, which may be vacuum deposited in a thickness of 6000 Angstrom units, with a length of $\frac{3}{16}$ inch and a width of .008 inch. With these dimensions the circuit is designed to operate with current pulses of the order of .080 microsecond in duration. It should be understood that the time scale of operation is proportional to linear dimension in the plane of the coils. For example, memory cells can be made to operate in .020 microsecond by reducing the scale as in FIGS. 6, 7, 8 and 9 to ¼. The result is that the superconductors of FIGS. 7 and 8 form circuit loops, each of which is capable of sustaining a persistent circulating current at the operating temperature of the device.

Since the superconductors of FIG. 8 have a lower critical current value than that of the superconductors of FIG. 7, each of the superconductors of FIG. 8 is capable of being switched to an electrically resistive state in response to current flow therethrough in excess of the critical current value, while at the same time allowing the superconductors of FIG. 7 to remain in a superconductive state. Accordingly, the arrangement of FIG. 4, like the device of FIG. 2, is capable of storing information as a function of the direction of persistent current flow with the stored information being ascertainable through the application of a sensing current pulse which produces a voltage pulse output when the persistent circulating current is in one direction and no voltage output when the persistent circulating current is in the opposite direction.

Figure 10:
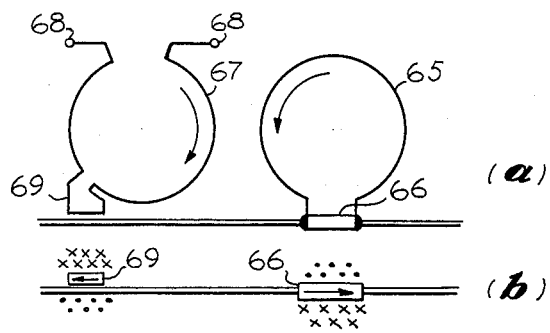
FIG. 10 is a diagrammatic illustration of a special arrangement in accordance with the present invention for substantially eliminating the appearance of spurious signals in the output circuit of the matrix memory system of FIG. 4.

As noted briefly above, the flow of current through the setting coils produces spurious signals in the output circuit even though the pulses applied to the setting coils are insufficient in magnitude to render any portion of the circuit loops electrically resistive. This phenomenon may best be understood by reference to the diagrammatic illustration of FIG. 10 in which FIG. 10(a) illustrates a superconductive loop having a circular superconductor 65 and a second superconductor 66. Inductively coupled to the superconductor 65 is a setting coil 67 which is displaced to the side in FIG. 10(a) solely for the purpose of explanation. When a set pulse is applied to the terminals 68 associated with the setting coil 67 in a direction of current flow indicated by the arrow, a current is induced in the circular superconductor 65 flowing in the direction indicated. In accordance with Lenz' law, the flow of current in the circular coil 65 is in a direction opposite to that of the flow of current in the setting coil 67. When the induced current flow is less than the critical current value of the superconductor 66, the entire circuit loop, comprising the superconductors 65 and 66, remains in a superconductive state. However, the effect of the set pulse applied to the terminals 68 may be either to increase or decrease the current flowing within the circuit loop momentarily.

In any circuit arrangement, it will be appreciated that there will be a certain amount of distributed inductance which in the case of the superconductor 66 may be vary small compared with the circular superconductor 65. However, the fluctuation in current flow through the distributed inductance of the superconductor 66, even though small, produces a voltage by self-induction which tends to oppose any change in current flow therethrough, again in accordance with Lenz' law. Therefore, even though the superconductor 66 may never be rendered electrically resistive, there is introduced into the series circuit connected to the superconductor 66 a voltage as the result of the application of a set pulse to the terminals 68.

As noted above, where a particular memory element is being sensed, the lack of appearance of a voltage output pulse may indicate persistent current flow in a given direction. Accordingly, the appearance of spurious voltages produced by the half inputs to the remaining elements in the same row and column as the one being interrogated may either individually or in the aggregate produce a spurious output signal which falsely represents the direction of persistent circulating current flow within a selected memory element. In the event of incomplete cancellation the output of the aggregate can be made to average toward zero by connecting the series diagonally as in FIG. 3.

However, in accordance with the present invention, the appearance of such spurious output voltages is substantially eliminated by means of an L-shaped conductor 69 which is serially connected with the setting coil 67. As noted previously in connection with the discussion of the construction of the arrangement of FIG. 4, the special L-shaped conductors of each of the setting coils are aligned with and deposited immediately above the output connections to each of the superconductive loops.

The operation of the special inductive configurations in substantially cancelling spurious output voltages may best be understood by reference to the diagrammatic illustration of FIG. 10 (b) in which the magnetic fields produced by current flow in one direction through the L-shaped conductor 69 are represented in conventional fashion with the dots indicating a field in a direction out of the page and the crosses indicating a field in a direction into the page. In a similar fashion, current flow through the superconductor 66 produces a magnetic field which is out of the page above the superconductor 66 and into the page below the superconductor 66. Since current flow in the direction illustrated through the L-shaped conductor 69 corresponds to a clockwise current flow in the setting coil 67 of FIG. 10 (a), producing a counterclockwise current flow in the circular superconductor 65, it may be seen in FIG. 10 (b) that current flow through the L-shaped conductor 69 is opposite to that of the current flow through the superconductor 66 so that the directions of the established magnetic fields are opposite. Therefore, any voltages produced in the superconductor 66 or in the output circuit to which the L-shaped conductor 69 is inductively coupled are substantially cancelled since any change in the magnitude or direction of the magnetic fields is opposite. Even though within the area of the L-shaped conductor 69 there may be generated a voltage in the output circuit of one polarity, and even though there may be generated in the area of the superconductor 66 a spurious output voltage of opposite polarity, the two voltages are substantially cancelled so that the effect of applying set pulses to the setting windings produces substantially no spurious signals in the output circuit connected to the superconductive loops.

Even though a particular configuration of setting coils and conductive configurations has been illustrated and described above in connection with a matrix memory system, it will be appreciated that the apparatus may be suitably modified to function as other than a memory system without departing from the invention. Accordingly, for example, the arrangement of FIG. 4 may be utilized to perform logical circuit functions as described and claimed in the United States patent granted to James J. Nyberg, No. 2,877,448, entitled, "Superconductive Logical Circuits."

In operation, circuits in accordance with the present invention may be maintained at a suitable low operating temperature by immersion in a coolant such as liquid helium. In a preferred cooling arrangement, an exterior insulated container may be adapted to hold a coolant such as liquid nitrogen within which an inner insulated container is suspended for holding liquid helium which maintains the circuits of the invention at the proper operating temperature. Where the setting coil and circular superconductors are constructed of lead and the switchable superconductors are constructed of tantalum, a suitable operating temperature is 4.2 Kelvin which is the boiling point of helium. By sealing the top of the container and employing a vacuum pump and a pressure regulation valve, the pressure within the chamber may be lowered so as to control the temperature of the helium for other combinations of materials. Connection to the circuits within the liquid helium may be made by means of lead-in wires which may also be constructed of a superconductive material within the cooled region to minimize resistance.

Although a particular arrangement of the invention has been described in detail above, it will be appreciated that the invention is not limited thereto. Accordingly, any and all modifications, variations or equivalent arrangements falling within the scope of the annexed claims should be considered to to be a part of the invention.

What is claimed is:

1. An electrical circuit device for storing a persistent circulating current including the combination of a superconductive circuit loop adapted to sustain a persistent circulating current, a first setting means coupled to the circuit loop, a second setting means coupled to the circuit loop, said first and second setting means being arranged so that persistent circulating currents are established in the superconductive circuit loop in a selected direction in response to the operation of both said first and second setting means simultaneously, an output circuit connected serially with at least a portion of the superconductive circuit loop, each of said first and second setting means including a section inductively coupled to the output circuit with a polarity such as to induce a voltage therein which is opposite and substantially equal to the spurious signal produced in the output circuit by the particular setting means.

2. A matrix memory system including the combination of a plurality of superconductive memory elements arranged in rows and columns, each of said memory elements comprising a pair of setting means and a superconductive loop which is adapted to store information as a function of the direction of flow of a persistent circulating current established therein, row connections between corresponding ones of the pair of setting means of each memory element, column connections between other corresponding ones of the pair of setting means of each memory element, an output circuit serially connected to at least a portion of each superconductive loop, means applying set pulses to a selected row connection, means applying set pulses to a selected column connection, and means inductively coupling each of said setting means to the output circuit with a polarity such that spurious signals appearing in the output circuit as a result of the application of set pulses to the setting means are substantially cancelled.

3. An electrical circuit device for storing a persistent circulating current including the combination of a superconductive circuit loop adapted to sustain a persistent circulating current, at least one setting coil coupled to the superconductive circuit loop for establishing persistent circulating currents therein, an output circuit connected serially in a first polarity relationship with at least a portion of the superconductive circuit loop, and means inductively coupling the setting coil to the output circuit in opposite polarity relationship such as to cancel spurious signals appearing in the output circuit during operation of the setting coil.

4. An electrical circuit device for storing information as a function of the direction of flow of a persistent circulating current including the combination of a superconductive loop adapted to sustain a persistent circulating current, at least one setting coil coupled to the superconductive loop for establishing persistent circulating current flow therein in response to the application of set pulses, an output circuit connected serially with a least a portion of the superconductive loop, and means inductively coupling the setting coil to the output circuit in a second polarity relationship such that spurious signals appearing in the output circuit in response to the application of a set pulse to the setting coil are substantially cancelled.

5. An electrical circuit device for storing a persistent circulating current including the combination of a superconductive circuit loop adapted to sustain a persistent circulating current, a first setting coil coupled to the circuit loop, a second setting coil coupled to the circuit loop, said first and second setting coils being arranged so that persistent circulating currents are established in the superconductive circuit loop in a selected direction in response to the operation of both said first and second setting coils simultaneously, and an output circuit connected serially with at least a portion of the superconductive circuit loop, characterized in that said first setting coil is inductively coupled to the output circuit in a polarity relationship such that spurious signals appearing in the output circuit as a result of the actuation of the first setting coil are substantially cancelled and said second setting coil is inductively coupled to the output circuit in a polarity relationship such that spurious signals produced in the output circuit as a result of the operation of the second setting coil are substantially cancelled.

6. A matrix memory system including the combination of a plurality of superconductive memory elements arranged in rows and columns, each of said memory elements comprising a pair of setting coils and a superconductive loop which is adapted to store information as a function of the direction of flow of a persistent circulating current established therein, first ones of the pair of setting coils of each memory element being serially connected in rows, second ones of the pair of setting coils of each memory element being serially connected in columns, an output circuit serially connecting at least a portion of each circuit loop, means applying set pulses to a selected row of setting coils, means applying set pulses to a selected column of setting coils, and means inductively coupling each of said setting coils to the output circuit in order to cancel spurious signals appearing in the output circuit as a result of the application of set pulses to the setting coils by voltages induced by said inductively coupling means.

7. An electrical circuit device including the combination of a first setting coil, a second setting coil, a circuit loop sandwiched between the first and second setting coils comprising a first superconductor in the configuration of a circular segment and a second superconductor connected across the circular segment, said second superconductor being adapted to be switched from a superconductive condition to an electrically resistive condition in response to current flow therethrough in excess of a predetermined critical current value, means applying pulses to the setting coils, an output circuit connected serially with the second superconductor, and means inductively coupling the setting coils to the output circuit with a polarity opposed to spurious signals from said second superconductor signals produced by the application of said pulses to the setting coils.

8. A matrix memory system including a plurality of memory devices arranged in rows and columns, each of said memory devices including a first superconductor in the form of a circular segment and a second superconductor connected across the circular segment to form a superconductive circuit loop which is adapted to store a persistent circulating current established therein, a first plurality of setting means arranged in rows, each of said row setting means being inductively coupled to a corresponding one of the circuit loops, a second plurality of setting means arranged in columns, each of said column setting means being inductively coupled to a corresponding one of the circuit loops, means applying setting pulses to a selected row and a selected column of setting means for establishing persistent circulating current in a selected one of the circuit loops and for sensing the direction of persistent circulating current flow established in a selected one of the circuit loops, at least one output circuit connected serially with the second superconductor in the circuit loops, and each of said row and column setting means being inductively coupled to the output circuit to cancel spurious signals appearing in the output circuit as a result of the application of set pulses to the setting means.

9. An electrical circuit device including the combination of a base plate, a first setting coil supported by the base plate, a layer of insulating material covering the first setting coil, a superconductive circuit loop deposited on the first insulating layer, a second insulating layer covering the superconductive circuit loop, a second setting coil deposited upon the insulating layer, a series circuit connected to a portion of the superconductive circuit loop, and at least a portion of each of the setting coils being positioned adjacent the series circuit for cancelling spurious signals appearing in said series circuit.

10. An electrical circuit device including the combination of a base plate, a first setting coil supported by the base plate, a layer of insulating material covering the first setting coil, a superconductive circuit loop deposited on the first insulating layer, said second superconductive loop comprising a first superconductor in the form of a circular segment and a second superconductor connected across the circular segment, a second insulating layer covering the superconductive circuit loop, a second setting coil deposited upon the second insulating layer, a series circuit connected to the second superconductor, and means inductively coupling each of the setting coils to the series circuit with a predetermined polarity such as to cancel spurious signals applied to the output circuit from the second superconductor, whereby a memory device is formed in which the first and second setting coils are inductively coupled to the superconductive circuit loop and in which each of the setting coils is inductively coupled to the series circuit.

11. A matrix memory circuit including the combination of a base plate, a first plurality of setting coils arranged in rows upon the base plate, row circuit connections to each of the first plurality of setting coils, a first insulating layer covering the row connected setting coils, a plurality of superconductive circuit loops supported upon the first insulating layer in rows and columns with the location of each superconductive circuit loop being adjacent a corresponding one of the row connected setting coils, output circuit connections to each of the superconductive circuit loops, a second insulating layer covering the superconductive circuit loops, a second plurality of setting coils supported on the second insulating layer in columns, each of said plurality of setting coils being positioned adjacent a corresponding one of the superconductive circuit loops, column connections to each of the second plurality of setting coils, and means including a portion of each of the row and column connected setting coils for inducing a voltage in series with the output connections such that spurious signals appearing in the output connections are cancelled.

12. A matrix memory system including the combination of a plurality of superconductive memory elements arranged in a rows and columns in a predetermined plane, each of said memory elements comprising a pair of setting means and a superconductive loop which is adapted to store information as a function of the direction of flow of a persistent circulating current established therein, row connections between corresponding ones of a pair of setting means in each memory element, column connections between other corresponding ones of a pair of setting means of each memory elements, an output circuit serially connected to at least a portion of each circuit loop, means applying set pulses to a selected row connection, means applying set pulses to a selected column connection, a superconductive sheet positioned in the plane parallel to said predetermined plane adjacent said plurality of superconductive memory elements, and means for combining said row and column connections with said superconductive sheet in a transmission line comprising means electrically connecting said row and column connections to said superconductive sheet whereby a transmission line is formed for passing set pulses along said row and column connections by means of a transmission line having a desired characteristic impedance.

13. A matrix memory system in accordance with claim 12 including means for establishing said output circuit and said superconductive sheet in a second transmission line comprising means connecting said output circuit to said superconductive sheet whereby a said second transmission line is formed having a desired characteristic impedance for signals produced in said output circuit.

14. A matrix memory system in accordance with claim 12 including a sheet of dielectric material positioned between the superconductive sheet and the plurality of superconductive memory elements to establish a particular characteristic impedance for said transmission line whereby the row and column connections, the superconductive sheet, and the dielectric sheet cooperate to present the characteristic impedance to the flow of pulses along the row and column connections.

15. An electrical circuit device including the combination of a base plate, a first setting coil supported by the base plate, a layer of insulating material covering the first setting coil, a superconductive circuit loop deposited on the first insulating layer, a second insulating layer covering the superconductive circuit loop, a second setting coil deposited upon the second insulating layer, a superconductive sheet supported on the base plate apart from the first setting coil, and means electrically connecting the setting coils to the superconductive sheet to provide a return current path, said first and second setting coils, said superconductive sheet and said connecting means comprising a transmission line having a desired characteristic impedance.

16. A matrix memory system including the combination of a base plate, a first plurality of setting coils arranged in rows upon the base plate, row circuit connections to each of the first plurality of setting coils, a first insulating layer covering the row connected setting coils, a plurality of superconductive circuit loops supported upon the first insulating layer in rows and columns with the location of each superconductive circuit loop being adjacent a corresponding one of the row connected setting coils, output circuit connections to each of the superconductive circuit loops, a second insulating layer covering the superconductive circuit loops, a second plurality of setting coils supported on the second insulating layer in columns, each of said second plurality of setting coils being positioned adjacent a corresponding one of the superconductive circuit loops, column connections to each of the second plurality of setting coils, a superconductive sheet supported by the base plate apart from the setting coils, and means electrically connecting the row and column circuit connections to the superconductive sheet to provide a transmission line having a desired characteristic impedance.

17. A matrix memory system in accordance with claim 16 including means connecting the output circuit connections to the superconductive sheet to provide a transmission line having a desired characteristic impedance for signals generated in said output circuit.

References Cited by the Examiner

UNITED STATES PATENTS

| | | | |
|---|---|---|---|
| 2,666,884 | 1/1954 | Ericsson et al. | 340—173.1 |
| 2,713,676 | 7/1955 | Fleming | 340—174 |
| 2,871,464 | 1/1959 | Wright | 340—174 |
| 2,877,448 | 3/1959 | Nyberg | 340—173.1 |
| 2,889,540 | 6/1959 | Bauer | 340—166 |
| 2,890,441 | 6/1959 | Duinker | 340—166 |
| 2,902,677 | 9/1959 | Counihan | 340—166 |
| 2,913,881 | 11/1959 | Garwin | 340—173.1 |
| 2,914,735 | 11/1959 | Young | 340—173 |
| 2,966,647 | 12/1960 | Lentz | 340—173.1 |
| 3,065,359 | 11/1962 | Mackay | 340—173.1 |

OTHER REFERENCES

"Trapped-Flux Superconducting Memory" by J. W. Crowe, "IBM Journal," pages 295 to 302, October 1957.

"An Analysis of the Operation of a Persistent-Supercurrent Memory Cell" by R. L. Garwin, "IBM Journal," pages 304 to 308, October 1957.

"Non-Destructive Read-Out of Superconducting Storage Elements" by Glicksman and Steele, RCA TN No. 221, Jan. 5, 1959.

IRVING L. SRAGOW, *Primary Examiner.*

EVERETT R. REYNOLDS, JOHN F. BURNS,
*Examiners.*

UNITED STATES PATENT OFFICE
CERTIFICATE OF CORRECTION

Patent No. 3,238,513            March 1, 1966

Frederick W. Schmidlin

It is certified that error appears in the above identified patent and that said Letters Patent are hereby corrected as shown below:

Column 3, line 46, "according" should read -- accordance --. Column 9, line 24, "vary" should read -- very --. Column 12, line 16, after "superconductor" cancel "signals". Column 13, line 21, cancel "a", first occurrence.

Signed and sealed this 2nd day of September 1969.

(SEAL)
Attest:

Edward M. Fletcher, Jr.

Attesting Officer

WILLIAM E. SCHUYLER, JR.

Commissioner of Patents